United States Patent
Bowes

(10) Patent No.: US 8,433,180 B2
(45) Date of Patent: Apr. 30, 2013

(54) SEARCH TOOL

(75) Inventor: Jonathan E L Bowes, Leamington Spa (GB)

(73) Assignee: JFDI Engineering, Ltd., Warwickshire (GB)

( * ) Notice: Subject to any disclaimer, the term of this patent is extended or adjusted under 35 U.S.C. 154(b) by 897 days.

(21) Appl. No.: 12/067,774

(22) PCT Filed: Sep. 22, 2006

(86) PCT No.: PCT/GB2006/003537
§ 371 (c)(1), (2), (4) Date: Jul. 8, 2008

(87) PCT Pub. No.: WO2007/034206
PCT Pub. Date: Mar. 29, 2007

(65) Prior Publication Data
US 2009/0052862 A1 Feb. 26, 2009

(30) Foreign Application Priority Data

Sep. 22, 2005 (GB) .................................. 0519372.7
Jan. 25, 2006 (GB) .................................. 0601530.9

(51) Int. Cl.
*H04N 5/91* (2006.01)
*G06F 3/041* (2006.01)

(52) U.S. Cl.
USPC ............................. 386/278; 386/230; 386/282

(58) Field of Classification Search ............. 386/69, 386/230, 278, 282
See application file for complete search history.

(56) References Cited

U.S. PATENT DOCUMENTS

| 6,684,087 | B1 | 1/2004 | Yu et al. |
| 6,747,674 | B1* | 6/2004 | Asami ............................ 715/721 |
| 6,807,306 | B1 | 10/2004 | Girgensohn et al. |
| 2001/0014203 | A1* | 8/2001 | Ito et al. ............................ 386/67 |
| 2002/0186958 | A1* | 12/2002 | Ikeda et al. ...................... 386/69 |
| 2003/0067479 | A1 | 4/2003 | Jung et al. |
| 2003/0229894 | A1 | 12/2003 | Okada et al. |
| 2004/0125124 | A1* | 7/2004 | Kim et al. ...................... 345/716 |

(Continued)

FOREIGN PATENT DOCUMENTS

| EP | 0061955 A1 | 10/1982 |
| EP | 0 999 504 A | 5/2000 |

(Continued)

OTHER PUBLICATIONS

Gil Zamorano, International Search Report for PCT/GB2006/003537; Dec. 11, 2006.

(Continued)

*Primary Examiner* — Jeffrey Pwu
*Assistant Examiner* — Samuel Ambaye
(74) *Attorney, Agent, or Firm* — Klarquist Sparkman, LLP

(57) ABSTRACT

A method of selecting a starting image at which to start displaying an image stream comprises the iterative steps of displaying a plurality of candidate images from within the image stream for selection by a user of the closest candidate image, and displaying a plurality of candidate images from within a time range of the image stream close to the candidate image selected by the user in response to the first step. This allows very fast and effective selection of a starting image. It can be used to quickly skip advertisement break within a recorded television program.

24 Claims, 7 Drawing Sheets

U.S. PATENT DOCUMENTS

| | | | |
|---|---|---|---|
| 2004/0161224 A1* | 8/2004 | Yamazoe et al. | 386/52 |
| 2005/0197763 A1 | 9/2005 | Robbins et al. | |
| 2006/0013560 A1* | 1/2006 | Jung et al. | 386/46 |
| 2007/0035652 A1 | 2/2007 | Toyoda et al. | |

FOREIGN PATENT DOCUMENTS

| | | |
|---|---|---|
| EP | 1 308 861 | 5/2003 |
| JP | 10-304301 | 11/1998 |
| JP | 11-069266 | 3/1999 |
| JP | 2000-148771 | 5/2000 |
| JP | 2001-052154 | 2/2001 |
| JP | 2001-52154 | 2/2001 |
| JP | 2002-262240 | 9/2002 |
| JP | 2004-72727 | 3/2004 |
| JP | 2004048318 | 12/2004 |
| JP | 2005-173087 | 6/2005 |
| JP | 2005-265842 | 9/2005 |
| JP | 2006-303635 | 11/2006 |

OTHER PUBLICATIONS

Gil Zamorano, Written Opinion of the International Searching Authority for PCT/GB2006/003537; Dec. 11, 2006.

Thomas, Combined Search and Examination Report under Sections 17 and 18(3) for British Patent Application No. GB0519372.7, Nov. 21, 2005.

Thomas, Combined Search and Examination Report under Sections 17 and 18(3) for British Patent Application No. GB0601530.9, May 12, 2006.

Zhang et al., "Content-Based Video Browsing Tools," Proceedings of the SPIE, SPIE, Bellingham, WA, vol. 2417, pp. 389-398, Feb. 6, 1995.

Reasons for Rejection (Japanese with English translation), JP 2008-531788, Feb. 28, 2012, 9 pages.

* cited by examiner

| time = 215 sec  $T_1$ | time = 215.63 sec  $T_2$ | time = 216.25 sec  $T_3$ |
|---|---|---|
| time = 216.88 sec  $T_4$ | time = 217.5 sec  $T_5$ | time = 218.13 sec  $T_6$ |
| time = 218.75 sec  $T_7$ | time = 219.38 sec  $T_8$ | time = 220 sec  $T_9$ |

Time elapsed between first and last image = 5 secs

Gap between images $\delta t = 0.625$ secs

Fig. 6

| time = -245 sec T₁ | time = -205 sec T₂ | time = -165 sec T₃ | Time elapsed between first and last image = 320 secs |
|---|---|---|---|
| time = -125 sec T₄ | time = -85 sec T₅ | time = -45 sec T₆ | Gap between images δt = 40 secs |
| time = -5 sec T₇ | time = 35 sec T₈ | time = 75 sec T₉ | |

Fig. 7

| time = 235 sec T₁ | time = 275 sec T₂ | time = 315 sec T₃ | Time elapsed between first and last image = 320 secs |
|---|---|---|---|
| time = 355 sec T₄ | time = 395 sec T₅ | time = 435 sec T₆ | Gap between images δt = 40 secs |
| time = 475 sec T₇ | time = 515 sec T₈ | time = 555 sec T₉ | |

Fig. 8

SEARCH TOOL

CROSS REFERENCE TO RELATED APPLICATIONS

This is the U.S. National Stage of International Application No. PCT/GB2006/003537, filed Sep. 22, 2006, which is hereby incorporated by reference and which was published in English under PCT Article 21(2), which in turn claims the benefit of British Patent Application No. 0519372.7, filed Sep. 22, 2005; and British Patent Application No. 0601530.9, filed Jan. 25, 2006.

The present invention relates to a method of selecting a starting image at which to start displaying an image stream, a system for selecting a starting image at which to start displaying an image stream and to a computer program, or a suite of computer programs, that can be used to implement this method in suitable hardware. It finds particular, but not exclusive, use in the field of video recorders such as a Sky+™ Box, as well as DVD players and computer implemented video display systems.

Often a person watching a television program or film using a personal video recorder may choose to start watching the program or film at a particular starting point other than at the beginning of the recording. When playing a DVD of, for example a sitcom series, such as "Friends", a viewer can select an episode at which to start watching the DVD. The recording on the DVD is separated into data packets, each corresponding to a different episode. The viewer is only able to play back the recording from the beginning of each data packet. This restricts the viewer to watching the DVD recording from a limited number of specific starting points.

The viewer may choose to skip adverts on a personal recording of a television broadcast or transmission. To find the end of each advert break, the viewer must fast forward the recording. He could increase the speed at which the recording is played (cue) whilst displaying an accelerated version of the recording. This is a time consuming way of searching the recording. He could fast forward through the recording at an even faster speed. This is a quicker way of moving through the recording, but the viewer cannot easily tell when he has advanced the recording to the end of the adverts without a large overshoot. Once the recording is played again, he is likely to have to cue or review to the correct point in the recording.

Sometimes data packets are spaced apart at fixed time intervals throughout the data stream of the recording. Selecting one of these data packets prevents a user readily identifying his preferred restarting point, if his chosen starting point occurs within a data packet. To select his chosen starting point, the viewer would have to fast forward or rewind the image stream from the beginning or end of a data packet.

The aim of this invention is to reduce the aforementioned shortcomings of the prior art.

In a first aspect of the invention there is a method of selecting a starting image at which to start displaying an image stream, the method comprising the iterative steps of: (1) displaying a plurality of candidate images from within the image stream for selection by a user of the closest candidate image; and (2) displaying a plurality of candidate images from within a time range of the image stream close to the candidate image selected by the user in response to step (1).

In this specification, reference is made to the "closest candidate image". When the closest candidate image is selected, this is not necessarily the candidate image that is closest in time to the starting image. It will be appreciated from this specification that, where a user selects the last of the candidate images that he recognises prior to the starting image, that last candidate image is considered closest to the starting image because the user would not be expected to recognise candidate images recurring later in the image stream. The phrase "closest candidate image" must be interpreted accordingly.

This method allows a viewer to rapidly identify the point at which he chooses to start, or restart, watching a program.

In the step of iteratively reselecting the reference image, the range of the image stream searched may be reduced in successive iterations. Advantageously, the scope of the search reduces on each successive iteration.

It is preferred that the method includes one or more iterative steps of displaying a plurality of candidate images from within a time range of the image stream close to the candidate image selected by the user in response to the previous iteration. This allows the method to select much more accurately the desired starting image.

When the candidate images are displayed, it is preferred that they are displayed in chronological order, thereby assisting the user in the operation of the method. It is more preferable for the candidate images to be arranged in the same configuration as a plurality of keys on a user controller, enabling a user to select an image by pressing an associated key. Each of the candidate images may include a corresponding number selection. In addition, to assist the user, a hard selection of a candidate image can be made which causes the image stream to be played starting from that image, or from an image extremely close to it. It is preferred that the hard selection can be made by holding a key on the keypad which corresponds to the selected candidate image for a relatively long duration, for example for more than 0.6 seconds or by pressing the key twice within a short period of time, for example within 0.5 seconds. This means that any further iteration which would normally come about is bypassed in favour of the system going straight to playing the image stream from that point. Other types of hard selection can be made. For example, the key on the key pad which corresponds to the selected candidate image could be pressed together with a shift or extension key in order to distinguish it from a normal press of that key. If the system uses on-screen selection, then some means of hard selection can be used on the screen. For example, if an on-screen pointer is used, the pointer can be moved to the desired candidate image, and a double click can be used to represent a hard selection. If a pointer is not used, but candidate images are selected using a focus which is moved from image to image on the screen, the appropriate candidate image can be highlighted using the focus, and a hard selection made, for example by double clicking on that selection. Where the screen is sensitive to being touched, touching the appropriate candidate image on the screen can be used to make a selection.

In some embodiments, it is advantageous to define the image stream from which candidate images are displayed, including a reference image at the beginning of the image stream. Displaying the candidate images may further comprise the step of displaying the time lapse of each candidate image with respect to the reference image.

The candidate images may be stationary, or a moving clip of the image stream giving moving pictures for each or some of the candidate images. The duration of each clip is preferably no more than two seconds. Where the time interval between candidate images is less than the duration of each clip, the candidate images can be stationary.

The candidate images will preferably be spaced apart by a time interval, and it is further advantageous for the time interval to reduce for each successive iteration. In each successive iteration, it is advantageous for the time interval to reduce according to a geometric progression.

In some circumstances it may be preferable if the time lapse between candidate images is adjustable. This allows the user to increase or reduce the time gap between the candidate images. Reducing the time gap may assist him in focusing in on the point at which he wishes to start the image stream. Increasing the time gap may allow the user to quickly search through a longer image stream. The time lapse between candidate images may be adjusted through the provision of a key or keys on the controller, for example the volume up and volume down keys.

Each step of displaying candidate images may include displaying the reference image as one of the candidate images. The reference image in the preferred embodiment precedes the other candidate images in the image stream. It is also preferred that the method further includes a step of displaying the starting image once a predetermined number of iterations have been executed. This may involve the counting of the number of iterations executed by the method. It may also be advantageous to analyse the time lapse between candidate images, or the duration of the image stream, and to increase or decrease the number of iterations executed by the method accordingly. For example, the number of iterations required to skip 3 or 4 minutes worth of advertisements in an image stream is likely to be less than to find a point within a 5 hour video recording. The processor operating this method may include an algorithm which determines the appropriate number of iterations to be used. Advantageously, the candidate images are spaced equidistant along the image stream.

The time interval in the first iteration can be at least 40 seconds. Advantageously, the initial time lapsed between each candidate image is longer than a user would normally want to 'cue' forward for through the image stream. Preferably the time interval on the last iteration is 0.625 seconds. As referred to above, it may be advantageous to be able to adjust the time lapse between candidate images. A preferred way of doing this is to use a key or keys on the controller to adjust the time lapse between candidate images. The keys used might include the volume up and volume down keys. Additionally, the number of iterations may be varied depending on the length of the image stream or on the time lapse in the first iteration.

There can be nine images displayed. There can be nine keys, and the keys could have a regular numeric key pad configuration, for example with the numerals 1 to 9. Advantageously the numbers on the key pad could be displayed on the display, each number with its associated image. The numbers can be arranged on the display so as to not obscure the candidate images. As referred to above, the keys can be used to make a hard selection in which the key is held down for a relatively long period of time in order to start the image stream from the candidate image corresponding to the key which is pressed.

The image stream may have an audio component. Advantageously, the method is suitable for application to audio visual programs, including, but not limited to, television programs, films or home videos.

The image stream may comprise a series of frames. Advantageously the image stream is a recording of a television broadcast which includes, but is not limited to: television programs, a film, or a home video.

In certain embodiments, this invention can be applied to a computer implemented system for displaying an image stream, such as Windows Media Player, but it can also be applied to personal video recorders, such as the Sky+™ box, TiVo recorder, portable video player, such as video iPod, or to DVD players or video players. In many of these systems, the image stream may originate from a broadcast, a cable television transmission, to a webstreaming Internet server or the like, and is recorded prior to play back using a suitable player. If the video stream is directed one to one from an Internet server to a user, then this search tool might operate at the webserver end, but be controlled by the user. Thus, the user, if he wishes to search for a particular point within the video stream, or if he wishes to skip a particular part of the video stream, can press a button or key which causes the system to go into a search mode whereby the user can search for a starting image in accordance with the invention. Thus, in that embodiment, the webserver will generate a set of candidate images for display on the machine of a user, which might be PC or an Internet-enabled television or the like. The user can then select the closest candidate image, and the remote webserver will then display another set of candidate images for further selection by the user. Clearly, this does not just apply to video streaming over the Internet, but can apply to other systems as well where a remote server serves video content on a one to one basis rather than multicasting it to multiple users.

In a second aspect of the invention there is a method for use in a processor of selecting a starting image at which to start displaying an image stream, the method comprising the steps of: (1) receiving an image stream from a data source; (2) forwarding the image stream to a display; (3) receiving a signal indicative of the selection of a reference image; (4) displaying a plurality of candidate images from within the image stream for selection by a user of the closest candidate image; and (5) repeating step (4) for a time range close to the candidate image selected in step (4).

In a third aspect of the invention there is a computer program, or suite of computer programs, arranged such that when executed by a computer it/they control the computer to perform the method of the first or second aspects of the invention.

In a fourth aspect of the invention there is a computer readable medium storing the computer program, or at least one of the computer programs, according to the third aspect of the invention.

In a fifth aspect of the invention there is a system for supplying a stream of images, comprising: (1) a processor arranged to receive a stream of images from an image source and to generate a video output to a display device; and (2) a user controller arranged to operate the processor to initiate a search mode to find a starting image at which to start displaying the image stream, wherein the processor is arranged to display a plurality of candidate images from within the image stream for selection by a user of the closest candidate image, and subsequently repeating this step from within a time range of the image stream close to the previously selected candidate image.

Advantageously, the system allows a viewer to rapidly identify the point at which he chooses to start or restart watching a program.

It is preferred that the processor is further arranged, in use, to reduce a range of the image stream searched in each successive iteration. It is further preferred that, in each iteration, the controller is arranged in use to reselect one of the candidate images displayed on the display as the reference image. In addition, the display may be arranged to display the candidate images chronological and the reference image may be arranged to precede one or more of the candidate images in the image stream.

It is preferred that the system is arranged to start running the image stream from a candidate image in response to a hard selection of that candidate image. For example, the system can be arranged such that the hard selection is achieved by holding a key of the controller for a relatively long duration. This allows a user to save time and skip further iterations if he is happy for the image stream to be shown from the candidate image which is hard selected.

Additionally, the processor may be arranged to allow the time lapse between candidate images to be adjusted. In one arrangement, the controller includes one or more keys arranged to be operated by a user to adjust the time lapse between candidate images, for example the volume increase and the volume decrease keys.

In the preferred embodiment, the processor is arranged to cause the display to display the time lapse for each candidate image with respect to the initial reference.

The controller may include at least two keys configured in the same arrangement as the candidate images displayed on the display, each candidate image corresponding to a key. The processor can be arranged to select the candidate images, each candidate image being spaced apart by the same time interval in the image stream, and the time interval reducing for each successive iteration and the preferred embodiment, the reference image is reselected a predetermined number of times. The processor may be arranged to control the display means to display the image stream starting from the starting image. The processor may be arranged to analyse the time lapse between candidate images or the duration of the image stream, and to increase or decrease the number of iterations executed by the method accordingly. This allows the system to be able to choose an appropriate number of iterations depending on the length of the image stream which is being searched. If a user is simply skipping 3 or 4 minutes of advertisements, then less iterations are likely to be needed than if the user is searching through a 5 hour video recording.

The system may further comprise a memory cache, the memory cache being controllable by the processor and being arranged to download a part of this image stream locally to the processor. Advantageously, the image stream required to be displayed on a display, either as a continuous image or the candidate image, is readily available on the memory cache. This avoids delay in requesting, receiving and obtaining part of the image stream for immediate display.

A personal video recorder may comprise the processor, the personal video recorder having a memory. Preferably, the memory is a hard drive, or a solid state memory.

In a sixth aspect of the invention there is a processor for selecting a starting image at which to start displaying the image stream, the processor comprising an input/output for receiving the image stream from a data source, for forwarding the image stream to a display, and for receiving a signal from a control means, the processor being arranged in use to: (1) receive the image stream from the data source; (2) forward the image stream to the display; (3) receive a signal from the control means indicative of an initial reference image selected from the display; and (4) iteratively reselect the reference image to select the starting image, the starting image being within a time period of the final reference image in the image stream.

A number of further aspects of preferred features will become apparent from the appended claims.

Further features and advantages of the present invention will become apparent from the following description of embodiments thereof, presented by way of example only, and with reference to the accompanying drawings, in which:

FIG. 6 is a schematic representation of a display showing nine candidate images in a third iteration;

FIG. 7 is a schematic representation of a display showing nine candidate images in a first iteration, and having scrolled back the image stream by one step;

FIG. 8 is a schematic representation of a display showing nine candidate images in a first iteration, and having scrolled forward the image stream one step.

FIG. 1 illustrates an example of a suitable system environment which includes a Sky+™ Box, in which the invention may be implemented. This system environment is only one example of a suitable system environment, being the preferred embodiment, and is not intended to suggest any limitation as the scope or functionality of the invention.

Figure 1:
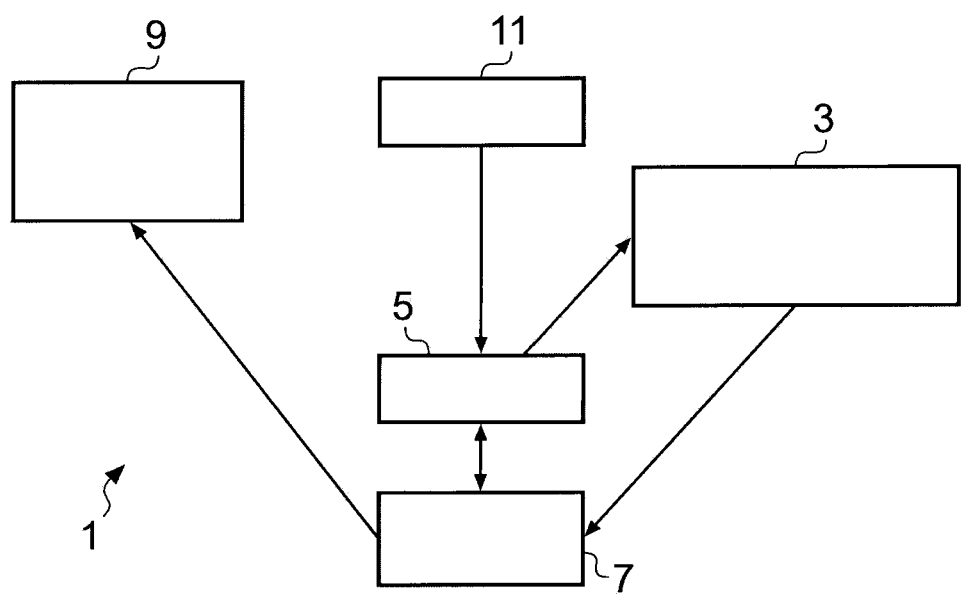
FIG. 1 is a schematic diagram representing the essential components of a preferred embodiment of a system for the invention.

The exemplary system 1 for implementing the invention shown in FIG. 1 has components which include: a data store 3 for supplying an image stream; a processor 5; a memory cache 7; a visual display unit 9; and a controller 11. The processor 5 and the memory cache 7 are connected to each other and are each arranged to communicate with the data store 3. The memory cache is connected to the visual display unit 9 and the controller is arranged to communicate wirelessly, or by wired means, with the processor 5.

In use, a request is sent from the processor 5 to the data store 3. The data store 3 downloads an image stream to the memory cache 7. On receiving instructions from the processor 5 the memory cache 7 forwards the image stream to the visual display unit 9 for displaying the image stream. Consequently the memory cache 7 can download and store the image stream in advance of the display of the image stream on the visual display unit 9.

Since the controller 11 is operable to control the processor 5, the controller 11 can be used to control the image stream that is displayed on the visual display unit 9, for example to pause the image stream at a particular image, or to fast forward or rewind the display of the image stream.

Figure 2:
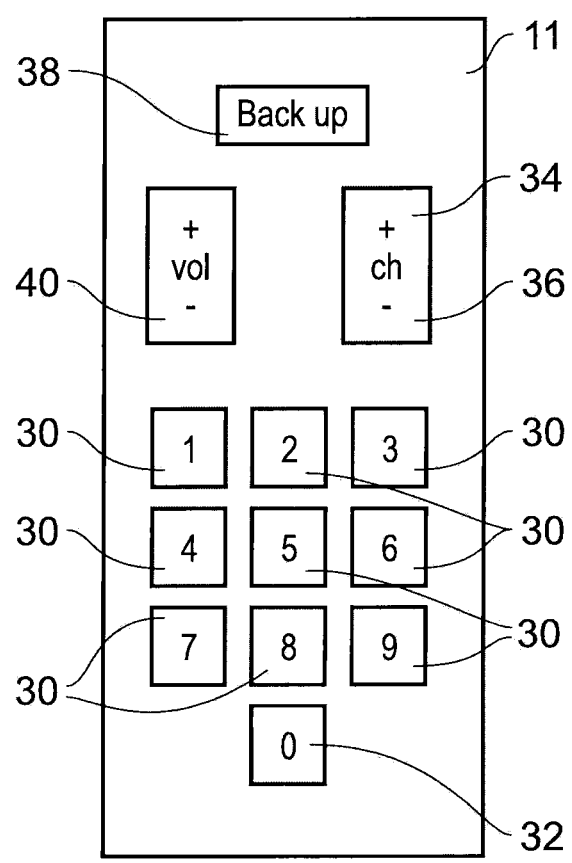
FIG. 2 is a schematic diagram representing a key pad of a controller for use in the invention.

FIG. 2 shows a controller 11 suitable for use in the system 1. The controller 11 has a numeric keypad for the numerals 1 to 9, (represented by label 30) and for zero, (32). It also has a channel up button 34, a channel down button, 36, a back up button 38 and a volume control button 40.

On receipt of instructions from the controller 11, the processor 5 is arranged to control the data store 3 to supply the image stream to the memory cache 7 to store the data stream and to forward parts of the stored data stream to the visual display unit 9. The processor is also arranged to receive signals from the memory cache 7. These signals include confirmations from the memory cache 7 indicating whether it is storing a particular part of the image stream.

Embodiments of the invention may be described in general context of computer-executable instructions, such as program modules, being executed by a computer. Generally, program modules include routines, programs, objects, components, data structures, and so forth, which perform particular tasks. The invention may also be practised in distributed computing environments where tasks are performed by remote processing devices that are linked through a communications network. In a distributed computing environment, program modules may be located in local and/or remote computer storage media, including memory storage devices. In this particular system, the data store can be a device remote from the rest of the system (e.g. at the head end of a cable television system), and the task of supplying the image stream is performed remotely.

Figure 3:
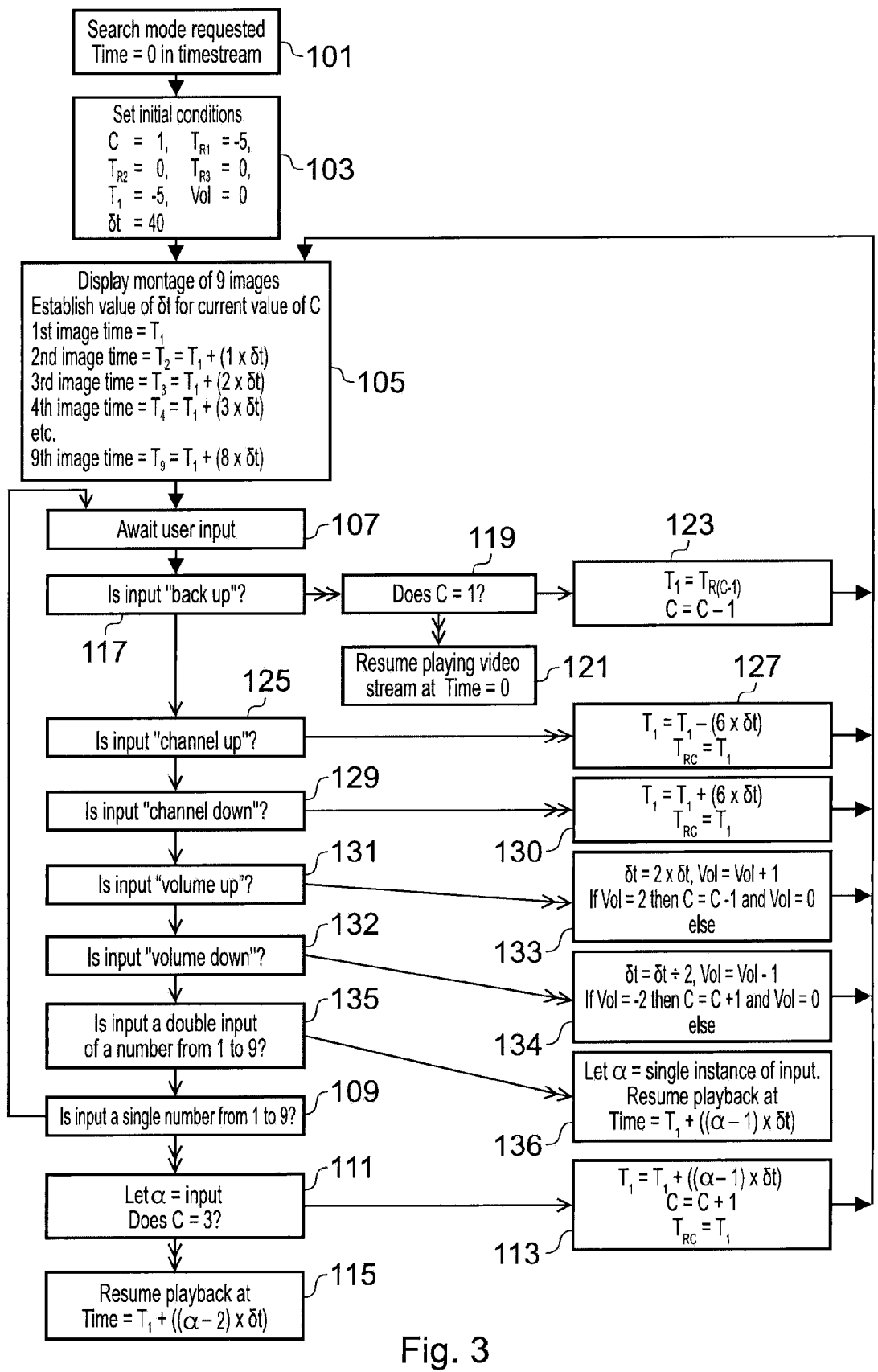
FIG. 3 is a schematic flow diagram representing the steps in a method embodying the invention.

In addition to the general functions described above, the system embodying the invention is arranged to implement a method of selecting a starting point in the image stream at which to start displaying the image stream, as schematically shown in the flow diagram of FIG. 3. The method allows a viewer to iteratively search for the starting image in an image stream of a recording supplied from a computer readable media, without having to fast forward or rewind the display of the image stream.

In the flow diagram, single solid arrow heads indicate movement of the process from one step to the next where there are no alternatives to that movement. A single open arrow head indicates that, of two alternative outcomes to a step, the arrow is following a negative result; and a double open arrow head indicates that the outcome of the step is a positive result.

In order to find a starting point in the image stream, it is first necessary to select or define the beginning and end of the image stream which is being searched. In some cases, this will correspond to a data packet, or to the entire recording. For example, in a DVD containing several episodes of "Friends", the data stream to be searched might be one of the episodes. Alternatively, it could be part of an episode, depending on the length of the data packets. If the DVD is a film, such as "Star Wars", the film may be divided into a number of packets, each of which could be searched independently. Alternatively, the whole film could be taken and a search carried out through the whole film. In a case where a recording has been made from a television broadcast, and it is desired to skip the advertisements which have been recorded, the video stream to be searched could be defined as a period of five minutes following the point in the program being watched when slipping is activated.

On activation of the search facility, and selection of the image stream to be searched, the viewer is presented with nine images in a three by three array on the television screen. Of course, in other embodiments, the array of images could be greater or smaller, but nine is a convenient number corresponding to the nine natural numbers of the keypad.

Generally speaking, each of the nine images shown in the array of images are spaced within the image stream. Thus, the first image will be at or near to the beginning of the image stream, and each of the subsequent images will be spaced evenly throughout the rest of the image stream. In the embodiments described, the image stream is effectively divided up into eight parts, and, with the exception of the ninth image, each image within the array corresponds generally to the beginning of each of those eight parts. Each of the displayed images in the array is a candidate image which can be chosen by the user by pressing the corresponding key on the key pad. In the embodiment shown in FIG. 4, the nine images are spread over a period of just over five minutes. Thus, it can be used to skip the viewing of an advertisement break within a film or television program which has been recorded. To skip the break, the user simply selects the candidate image which is the first image after the advertisement break, and that immediately takes the viewer to a position quite close to the end of the advertisement break. A fresh array of nine candidate images is then displayed on the screen corresponding to the part of the image stream which was selected by the user in his first selection, in the first iteration. Thus, the fresh set of candidate images forms a second iteration of the process where again the first image not associated with the advertisement break is selected, thereby taking the viewer closer to the end of the advertisement break. By taking this action in a number of iterations, the user very quickly homes in on the starting image from which the viewing of the program or film should be recommenced. The number of iterations is likely to depend on the initial length of the image stream. The number of iterations is likely to be less for skipping an advertisement break than for searching for a point within a two hour film. The processor may include an algorithm which determines the number of iterations based on either the length of the image stream being searched through, or the duration of the time lapse in the current iteration.

Selection of the appropriate candidate image is achieved above by pressing the corresponding key on the keypad. Selection is achieved by a normal, brief, press of the key. However, if the user wishes simply to start the image stream from one of the images without going to a further iteration, he or she can press the appropriate key corresponding to the image from which the image stream should continue and can hold the key down for a longer period of time, for example for 1 second. This kind of selection can be described as a "hard" selection which refers to the duration for which the key is held rather than how hard it is pressed. A hard selection could also be achieved by some other distinct way of selecting the image. For example, the numbered key on the keypad could be pressed together with a shift or extension key which might be present (not shown). Instead of selecting candidate images using the numbered keys of a keypad, an on-screen selection system may be used, in which the candidate image is selected on screen. Typical examples of on-screen selection would be a moveable pointer which can be positioned over a candidate image to be selected, and then selected by the click of enter button on the keypad. Another type of on-screen system highlights each image by use of a focus, and arrow keys or a joystick on the keypad can be used to move the focus from candidate image to candidate image. The candidate image can be selected, for example, by depressing an enter key. In such cases, a hard selection could be made by pressing an alternative key, or by double clicking the selection or enter key instead of a single click used for making a soft selection. In a further embodiment (not shown), the screen is touch sensitive, and to make a selection, the user simply touches the appropriate candidate image on the screen.

More details of the embodiments of this invention will now be described.

Initially, the image stream is displayed on the visual display unit 9. A viewer initiates, in a first step 101, a process implementing the method by pressing a search key on the controller 11. This selects an initial reference image. It could be the image displayed on the screen at the time of the depression of the search key, or an image from a short time before the depression of the key. In the example that follows, the image is taken from the image stream five seconds before the key is depressed. The search which is initiated here is one which allows the user to skip advertisements. Therefore the user initiates the search when he reaches the beginning of the advert break, and it allows him to skip it quickly and easily. The initial reference time corresponds generally to the beginning of the advert break. The search will take place over the following 320 s of image stream. In the process all further images in the image stream have a time lapse T with respect to an initialisation image. The initialisation image is the image that was being displayed when the search key was depressed to initialise the search facility. The reference image therefore has a time lapse T of −5 seconds. By having a time lapse T of −5 seconds, the full range of the video stream is extended slightly. This allows the first candidate image to be set a little before the time at which the search is selected. In some embodiments, users might find it more acceptable if the time is set to 0 seconds. This embodiment will be described with reference to FIG. 4.

In a second step 103, the processor sets the conditions for the search. Each iteration has a count value (C), which is initially set to one. In each iteration, the processor selects a number of candidate images. The reference time of the first iteration $T_{R1}$ ($T_{RC}$, where C is the iteration count value) is set to the same value as the first candidate image 13, $T_1$.

In a third step, 105, the processor 5 instructs the memory cache 7 to provide nine candidate images 15 from the image stream. Each image is spaced apart in the image stream from the adjacent images by a time interval, δt, of 40 seconds. This value could be changed by the user if required. For example, the value could be changed 131, 132 using the volume keys 40. Instead of increasing and decreasing the sound, the volume keys could be used for increasing 131 and decreasing 132 the time interval 133, 134. Alternatively, the value of the time gap could be changed 133, 134 using some other user input from the keypad or elsewhere. In FIG. 3 in boxes 133 and 134, when the volume up or volume down buttons are pressed, the time lapse is either doubled or halved giving a geometric progression. However, alternative embodiments might increase or decrease the time lapse by a set amount, for example by 20% of the original time lapse. This will increase or decrease the time lapse by steps which are an arithmetic progression instead of a geometric one. δt is the time gap between images, i.e. between $T_1$ and $T_2$, $T_2$ and $T_3$ etc. It is dependent on the value of C. In this embodiment;

for C=1 δt=40 s

C=2 δt=5 s

C=3 δt=0.625 s

Figure 4:
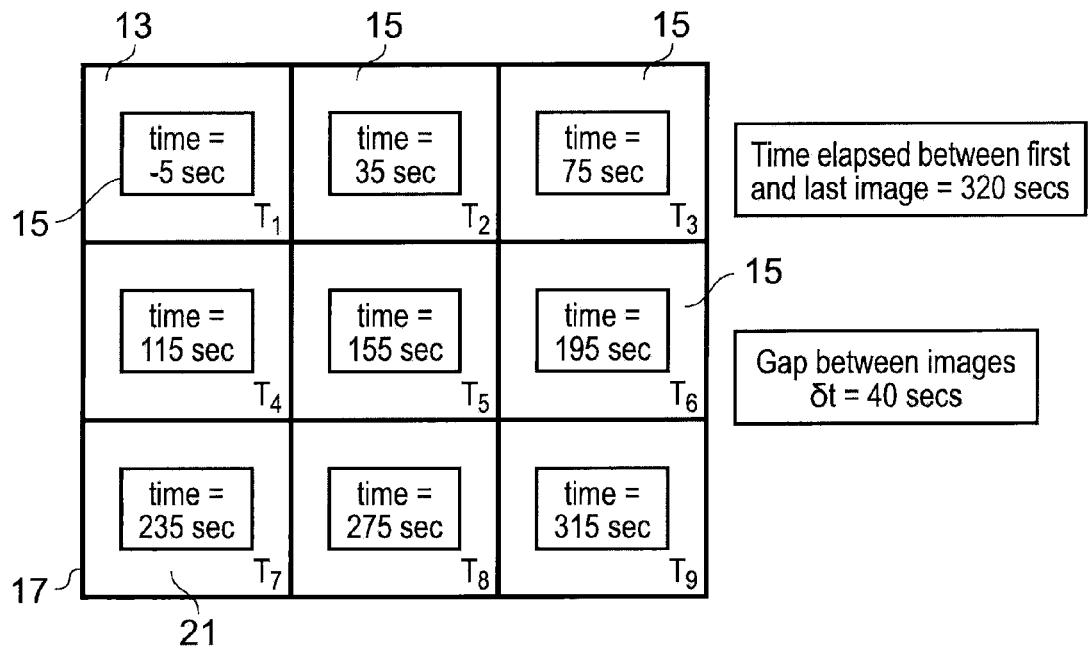
FIG. 4 is a schematic representation of a display having nine candidate images in a first iteration.

The first of these nine images is the first candidate image 13. If the memory cache does not store any of these images, the processor 5 instructs the data store 3 to send the image stream having these missing images to the memory cache 7. The memory cache 7 then despatches the candidate images 15 to the visual display unit 9. The images are displayed on the visual display unit in chronological order. The first image at $T_1$ in the image stream is shown as the first candidate image 13, in the top left hand corner of screen 17 of the visual display unit 9. The second image at $T_2$ in the image stream is shown in the middle of the top row on the screen 17. This repeated for each of the remaining seven images so that the last candidate image at $T_9$ in the image stream is the image in the bottom right hand corner of the screen 17, as shown in FIG. 4. The candidate images are displayed to the viewer until the processor 5 receives a signal from the controller 11. The processor 5 awaits a signal from the controller 11 in the fourth step 107. Any one of a number of different inputs can be received from the controller 11. This will be clear from FIG. 3. However, ultimately it is necessary for the user to select one of the candidate images which is designated here as the fifth step 109. However, it will be appreciated that between the fourth and fifth steps, there are other inputs which may be made.

The controller has a key pad that is a standard numerical key pad. Each numerical key 30 is between one and nine, inclusive, and has an associated candidate image 13. A viewer selects one of the new candidate images. The reference image for the next iteration will be the candidate image before the one that was selected (pressing key 6 selects the fifth image as the reference image for the next iteration). In a sixth step 109, where the key is a not a numeric key 30 between 1 and 9, the process returns to the fourth step 107 until a numeric key is pressed. As described above, if a hard selection is made, the video stream will run from the image selected. In this embodiment, a hard selection is made by double pressing or double clicking on the numeric key, and this is identified by the fifth step 135. If no double click is detected, then the process moves to step 6. If, however, a double input is detected, then playback is resumed 136.

In the sixth step 109, the processor notes the input numeric key, α. In a seventh step 111, the iteration count C is checked to ensure it is not equal to three, indicative of a third iteration. (The process is arranged to stop after three iterations). If C is not equal to three, the process continues to a seventh step 113 to continue the process in a further iteration in which the time interval, δt, is reduced.

In the eighth step 113 the conditions of the search are altered. The value of count C is increased by one. The time in the image stream of the new first candidate image, $T_1$, i.e. the new reference image, is calculated whereby the current time interval, δt, is multiplied by an integer one less than the value of depressed numeric key, α, and this value is then added to the time of the previous first candidate image:

$$T_{1\,new} = T_{1\,old} + ((\alpha-1) \times \delta t)).$$

Figure 5:
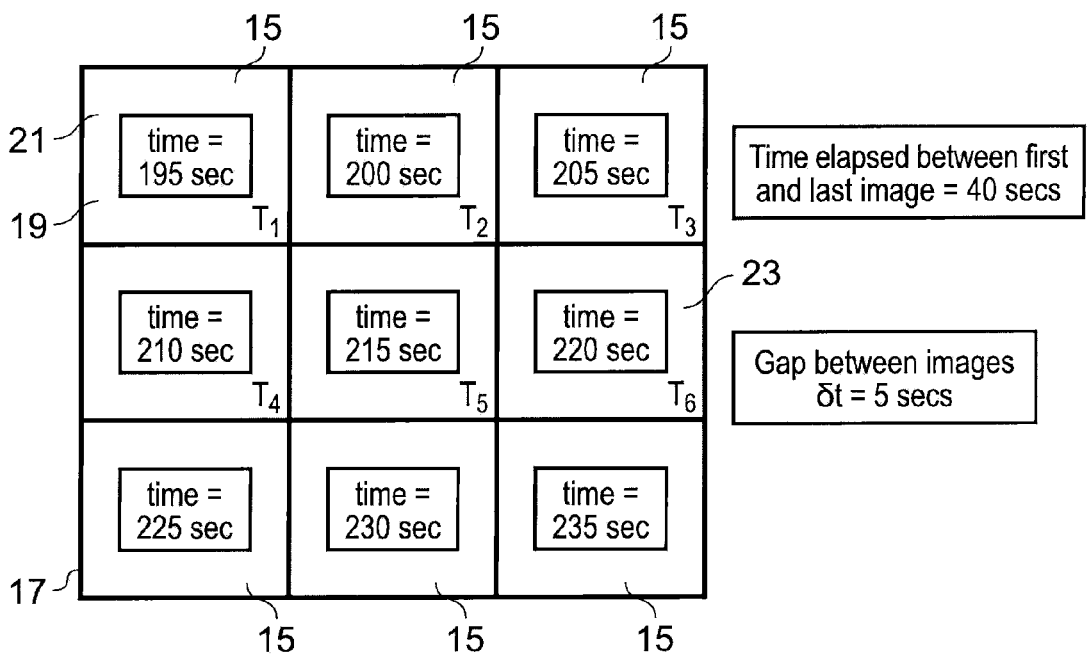
FIG. 5 is a schematic representation of a display having nine candidate images in a second iteration.

The reference time value for the second iteration, $T_{R2}$, is set to the new value of the first candidate image, $T_{1new}$. The process then returns to the third step 105. The time interval, δt, is reduced by a factor of eight, although this could be any value up to one less than the number of candidate images selected from. The visual display unit 9 displays nine candidate images as shown in FIG. 5, where the nine images are each spaced apart along the image stream by a time interval of five seconds. The selection of candidate images shown in FIG. 5 are derived from selecting the seventh image of the first iteration shown in FIG. 4. In FIG. 5 the first candidate image 19 is located in the image stream 195 seconds after the initialisation image.

The third, fourth, fifth, sixth, seventh and eighth steps of the process are repeated, as shown by way of example in FIG. 6 for the third iteration. In the second iteration of this example, the numeric key six is pressed, and in third iteration the numeric key seven is pressed. In the third iteration the candidate images are spaced apart by intervals of 0.625 seconds. Where, in the seventh step 111, the iteration count, C, is found to be three, the process then proceeds to a ninth step 115. The candidate image before the selected image becomes the starting image.

In the ninth step 115, the starting image is displayed on the screen. In one embodiment the visual display unit 9 starts the playback of the image stream immediately. In another embodiment, the image stream is frozen on the display 9 until a key on the controller 11 is depressed to initiate playback.

In this preferred embodiment, playback of an image stream can resume without a user selecting one of the candidate images. If a back up button 38, which could also be the numeric key zero 32, is pressed on the numeric key pad of the controller 11, the process enters a "backup" mode 117. If the iteration count C has a value equal to one, in the step 119, the image stream is played back from one second in the image stream preceding the initialisation image, as in step 121. If the iteration count, C, does not equal one, in step 123, the reference image is the same as the first candidate image of the previous iteration, and the value of the iteration count C is reduced by one. The process then returns to the third step 105, in which the visual display unit 9 displays the candidate images of the previous iteration. This also enables a viewer to review the candidate images of a previous iteration if he realises that he has selected the wrong candidate image in an iteration.

Alternatively or additionally, if the viewer selects candidate images which have a range which does not include the starting image, he can search through the image stream without returning to the previous iteration. If the starting image lies before the first candidate image on the visual display unit 9, at $T_9$ in the image stream, the viewer could depress a channel up button 34 on the controller 11. The process enters a "scroll up" mode 125. In this step 127 the time of the first candidate image $T_1$ is reset to precede the current value of $T_1$ by six time intervals, $\delta t$, of the current iteration. The time value of the current iteration $T_{RC}$ is set equal to the new value of $T_1$. The process returns to the third step 105, the visual display unit 9 displaying nine candidate images, each spaced apart by the time interval, $\delta t$, and where the first candidate image is taken from the image stream at the new $T_1$. FIG. 7 shows the effect of the scroll up process of the image shown in FIG. 4.

If the viewer chooses to search for the starting image after the last candidate image currently displayed, the viewer could depress a channel down button 36 on the key pad of the controller 11, to enter a "scroll down" process 129. In this step 130, the time of the seventh candidate image at $T_7$ becomes the time of the first candidate image at $T_1$. The time value of the current iteration $T_{RC}$ adopts the new value of $T_1$. The process then returns to the third step 105, as shown in FIG. 8, where the scroll down process has been applied to the images displayed in FIG. 4.

In using the invention when playing back a recording, the user can select an initial reference image 101. The display shows nine images 40 seconds apart and the first image $T_1$ precedes the initialisation image by five seconds, as shown in FIG. 4. If the viewer were to select the seventh image 21 in FIG. 4, the visual display unit 9 would then display nine images five seconds apart, as shown in FIG. 5, the last image being the seventh image 21 of FIG. 4. If the viewer then selects the sixth image 23, the visual display unit 9 displays the nine images as shown in FIG. 6, where the last image $T_9$ is the sixth image 23 of FIG. 5, and the images are 0.625 seconds apart. The viewer can select his start image from any of these nine images. The start image will be the candidate image that precedes the image that is finally selected. The visual display unit 9 will then start displaying the image stream from the start image.

In all these candidate images, the position of each image in the image stream is expressed as a function of time with respect to the initialisation image, and can be displayed on the visual display unit 9 in association with the respective candidate image.

This preferred embodiment searches for the start image by selecting an image to be the first image of the range of the image stream that the viewer chooses to watch. The method can be modified so the selected image for each iteration becomes the first image of the next iteration, so the method selects the start image by way of the last image in the range of the image stream that the viewer chooses not to watch.

The numeric key values associated with the image can also be displayed with the associated image. Any number of images can be shown on the visual display unit 9, so long as at least two are shown, and the viewer has a means of selecting all of the images in the image stream. The initial time interval between candidate images can be any value appropriate for the purpose of the search, and the number of iterations can also be any predetermined number. Indeed the number of iterations need not be predetermined and may be conditional upon the size of the time interval between candidate images in an iteration.

The ratio of the time interval between iterations can be any value, so long as there are a sufficient number of candidate images, and the time interval between them is sufficient, for the whole of the chosen range image stream to be searched.

The information about each candidate image, for example the corresponding key on the key pad and the time location in the image stream with respect to the initial reference image, can be displayed so this information does not obscure the images.

The images can be stationary or moving. If the images are moving the duration of each image clip is 2 seconds, but could be more or less than this in other embodiments. Once the time interval is reduced to be shorter than the time interval between candidate images in the image stream, each image is displayed for the duration of the time interval, each image starting from one of the candidate images. To ensure he views the image of his chosen starting point, a viewer will select a candidate image as his reference image that precedes the starting image he would normally choose if the images were stationary.

The image stream can comprise a series of frames. If the time in an image stream selected from an image does not have an image frame, or has a contrast that is insufficient for the image to be discernible, the next frame in the image stream is displayed.

The controller can be operated by keys or operating means other than a numeric keys. The arrangement of the candidate images can be arranged to suit the arrangement of the keys used on the controller.

Additional search modes may be used within the scope of this invention. In an additional embodiment which may be executed on the system shown in FIG. 1, the processor may be arranged such that when a user searches forwards or backwards through an image stream while watching the image stream (cue/review), when the user stops searching, a multi-image search mode is entered. In conventional machines for watching video programs or recordings, it is possible to search forwards or backwards whilst watching the image stream, and often it is possible to search at different speeds. Such searching forwards and backwards is normally done to find a particular point at which the user wishes to start watching a recording. In such a search, an amount of overshoot is inevitable: it takes a certain amount of time to stop the search once he recognises the point at which he wishes to start from. Overshoot will depend on two things, firstly the speed of reactions of the user, and secondly the speed at which the video stream was being searched through. The faster the searching, the greater the overshoot. In this search mode, when the searching is stopped, the processor in the device is arranged such that it enters the multi-image search mode in which a number of images are put on screen, preferably nine, which are shown in the order in which they will appear in the image stream. Where the multi-image search mode has been entered following a search backwards through the image stream, the final image which is reached at the end of the overshoot forms the first candidate image. Eight subsequent images are shown, each of which is spaced from the previous image by a time lapse or time space. The time lapse might be dependent on the speed with which the search forward or search back was carried out immediately prior to the search being stopped. Therefore, a fast search might require a time lapse of 10 seconds between each image, whereas a slower search will result in a smaller overshoot, and the time lapse may be 1 second. These are, however, examples, and the time lapse might be greater than 10 seconds or less than 1 second.

If the searching prior to the overshoot was a forward search, then the image selected at the end of the overshoot will form the last of the candidate images, and the other eight images will be arranged sequentially before that final candidate image. Selection by the user of the most appropriate candidate image can then permit the image stream to play from that point, or alternatively to result in one or more further iterations.

Some personal video recorders that are available can be arranged to record the last 10, 15, or an alternative number of minutes of a live broadcast or other image stream that a viewer is watching. In an additional search mode, which might be called an action replay search mode, the processor is arranged such that when the viewer is watching a broadcast or other image stream, a period of recently watched image stream is recorded, for example the preceding 10 minutes of the image stream, and the processor is further arranged such that, when the search button is pressed, it pulls up nine candidate images from within that recorded time. The ninth image will be the one that was current when the search button was pressed. If the spacing is 10 seconds, the minimum length of the image stream which must have been recorded will be 80 seconds. Pressing the number on the keypad relating to the candidate image which is selected will cause the video stream to start from the selected candidate image, effectively giving an action replay facility. It may be possible to increase or decrease the time lapse between candidate images using the volume control buttons. If it is possible to increase the time lapse, then more than 80 seconds will need to be recorded from the preceding viewed image stream. Further iterations might also be possible, if required. The system 1 on which the invention operates is anything that is suitable to playback a recording as an image stream, for example a CD Rom player, a DVD player, a computer running a video player program or a Sky+™ Box. Examples of computer video players are Microsoft Media Player and Adobe Flash Player and Real-Player. The software which give the functionality of the present invention can be incorporated into the computer video player software, or can be supplied by way of a plug-in which adds the functionality to an existing computer video player program which does not originally have the functionality of the present invention. The data store 3 can be connected to the processor 5, or it can be remote from the rest of the system 1. The arrangement of the processor 5, the memory cache 7, the data store 3 and the visual display unit 9 so far described is only exemplary. The processor 5 could exclusively communicate with the data store 3. The memory cache 7 could be remote from the data store 3 and the processor 5, or be located with the visual display unit 9. The visual display unit 9, the processor 5 and the data store 3 may each therefore comprise a computer including a computer readable medium.

The computer readable medium can be any available media that can be accessed by computer and includes both volatile and non-volatile media, and removable and non-removable media. By way of example, and not limitation, computer readable media may comprise computer storage media and communication media.

Computer storage media includes volatile and non-volatile removable and non-removable media implemented in any method or technology for storage of information such as computer readable instructions, data structures, program modules, or other data. Computer storage media includes, but is not limited to RAM, ROM, EEPROM, flash memory or other memory technology, CD-Rom, digital versatile disks (DVD) or other optical disk storage, magnetic disk storage or magnetic storage devices, or any other medium which can be used to store the desired information and which can be accessed by the computer.

Communication media typically embodies computer readable instructions, data structures, program modules, or other data in a modulated data signal such as carrier wave or other transport mechanism and includes any information delivery media. The term "modulated data signal" means a signal that has one or more of its characteristic set or changed in such a manner as to encode information in the signal. The term "image stream" referred to herein is such a modulated data signal that encodes image data. By way of example, and not limitation, communication media includes wired media such as wired network or direct wired connection, and wireless such as acoustic RF, infrared and other wireless media. Combinations of any of the above should be included within the scope of computer readable media.

The image stream may also have an audio component and the system is arranged to broadcast that audio component together with display of the image stream on the visual display unit.

Figure 9:
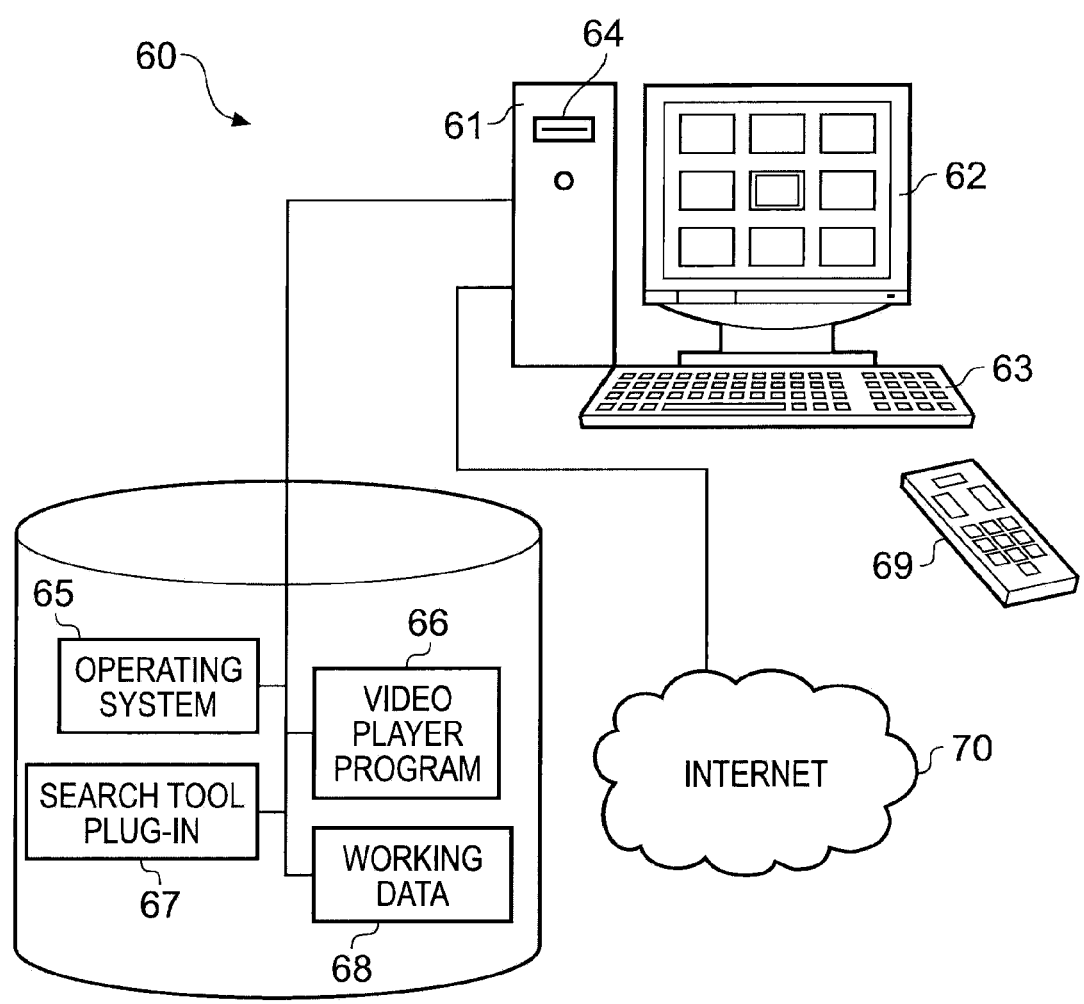
FIG. 9 is a diagram showing a computer implementing a further embodiment of the invention.

A computer implemented embodiment is shown in FIG. 9 in which a computer system 60 is shown including a PC, a computer screen 62 a keyboard 63 and a controller 69. The PC includes a media drive unit which, in this example, is a DVD player 64. It will be appreciated that any suitable drive might be included, or the PC's hard drive could be used as a source of the image stream. Additionally, the image stream could be received from any other suitable source, including the Internet 70. Running on the PC 61 is an operating system 65 on which is running a video player program 66, such as Microsoft Media Player, a search tool plug-in 67, and working data on which the video player program 66 operates. In this example, the working data 68 would normally be the video stream. The search tool plug-in 67 is a piece of software in addition to the video player program, although, it could be incorporated within the video player program itself. Thus, the plug-in can be supplied as independent software, or can be incorporated within the video player program as required. The combination of the video player program and the search tool plug-in operating together means that, during the use of the video player program to display a video stream, the plug-in 67 can be invoked so as to utilise the searching facilities described in FIGS. 3 to 8. A controller 69 could be used, or the functions of the controller's buttons could be substituted by keys on the keyboard 63, buttons available on a touch screen 62, or buttons selectable using a mouse (not shown).

The invention claimed is:

1. A method of selecting a starting image at which to start displaying an image stream, the method comprising the iterative steps of:
   (1) displaying a plurality of candidate images from within a part of the image stream for selection by a user of the closest candidate image; and
   (2) displaying a plurality of candidate images from within a time range of the image stream close to the candidate image selected by the user in response to step (1) for selection by a user of the closest candidate image;
   wherein the candidate images are displayed in chronological order spread apart by a time interval, the time interval being reduced for each successive iteration;
   the method further comprising displaying the starting image in response to the selection of a candidate image in the last of the iterative steps;
   the method further comprising a scrolling mode in which, if the starting image lies in the image stream at an earlier time than the first candidate image that is displayed, or at a later time than the last candidate image that is displayed, the candidate images that are displayed in any of the iterations are replaced by candidate images in an adjacent part of the image stream to effect scrolling.

2. A method as claimed in claim 1, further including one or more iterative steps of displaying a plurality of candidate images from within a time range of the image stream close to the candidate image selected by the user in response to the previous iteration.

3. A method as claimed in claim 1, wherein, in displaying the candidate images, the candidate images are arranged in the same configuration as a plurality of keys on a user controller that is used to reselect the reference image.

4. A method according to claim 3, wherein, in response to a hard selection of a candidate image, the image stream starts to be played from that image.

5. A method according to claim 4, wherein holding a key to select a candidate image for a relatively long duration constitutes a hard selection.

6. A method according to claim 4, wherein pressing a key twice in a short period of time constitutes a hard selection.

7. A method according to claim 1, wherein the candidate images are arranged on a touch-sensitive screen such that touching a candidate image on the screen selects that candidate image.

8. A method according to claim 1, wherein each candidate image is displayed together with a corresponding selection number.

9. A method according to claim 1, including defining the image stream from which candidate images are displayed, including a reference image at the beginning of the image stream.

10. A method as claimed in claim 9, wherein the step of displaying the candidate images further comprises the step of displaying the time lapse of each candidate image with respect to the reference image.

11. A method as claimed in claim 1, wherein, on each successive iteration, the time interval reduces according to a geometric progression.

12. A method as claimed in claim 10, wherein the time lapse between candidate images is adjustable.

13. A method as claimed in claim 12, wherein the time lapse between candidate images can be adjusted using a key or keys on the controller, or using selectable regions on a touch-sensitive screen.

14. A method as claimed in claim 1, including analyzing the time lapse between candidate images or the duration of the image stream and increasing or decreasing the number of iterations executed by the method accordingly.

15. A computer program or suite of computer programs arranged such that when executed by a computer it controls the computer to perform the method of claim 1.

16. A system for supplying a stream of images, comprising:
(1) a processor arranged to receive a stream of images from an image source and to generate a video output to a display device; and
(2) a user controller arranged to operate the processor to initiate a search mode to find a starting image at which to start displaying the image stream, wherein the processor is arranged to carry out the iterative steps of:
(a) displaying a plurality of candidate images from within apart of the image stream for selection by a user of the closest candidate image, and
(b) subsequently repeating step (a) from within a time range of the image stream close to the previously selected candidate image;
wherein the candidate images are displayed in chronological order spaced apart by a time interval, the time interval being reduced for each successive iteration;
the processor being further arranged to display the starting image in response to the selection of a candidate image in the last of the iterative steps;
the processor being arranged with a scrolling mode in which, if the starting image lies in the image stream at an earlier time than the first candidate image that is displayed, or a later time than the last candidate image that is displayed, the candidate images that are displayed in any of the iterative steps are replaced by candidate images in an adjacent part of the image stream to effect scrolling.

17. A system as claimed in claim 16, wherein the processor is further arranged in use to reduce a range of the image stream searched in each successive iteration.

18. A system as claimed in claim 17, wherein in each iteration the controller is arranged in use to reselect one of the candidate images displayed on the display as the reference image.

19. A system as claimed in claim 18, wherein the system is arranged to start running the image stream from a candidate image in response to a hard selection of that candidate image.

20. A system as claimed in claim 16, including a touch-sensitive screen arranged to display the candidate images for selection.

21. A system as claimed in claim 17, wherein the reference image is reselected a predetermined number of times.

22. A system according to claim 16, wherein the processor is arranged to analyse the time lapse between candidate images or the duration of the image stream, and to increase or decrease the number of iterations executed by the method accordingly.

23. A system as claimed in claim 16, wherein the system further comprises a memory cache, the memory cache being controllable by the processor and being arranged to download a part of the image stream locally to the processor.

24. A system as claimed claim 16, wherein a personal video recorder includes the processor, the personal video recorder having a memory.

* * * * *